United States Patent
Reial et al.

(10) Patent No.: US 11,310,753 B2
(45) Date of Patent: Apr. 19, 2022

(54) WIRELESS COMMUNICATION DEVICE, NETWORK NODE, METHOD AND COMPUTER PROGRAM FOR ACHIEVING SYNCHRONIZATION

(71) Applicant: Telefonaktiebolaget LM Ericsson (publ), Stockholm (SE)

(72) Inventors: Andres Reial, Malmö (SE); Stephen Grant, Pleasanton, CA (US); Claes Tidestav, Bålsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 42 days.

(21) Appl. No.: 16/607,017

(22) PCT Filed: May 9, 2018

(86) PCT No.: PCT/EP2018/062046
§ 371 (c)(1),
(2) Date: Oct. 21, 2019

(87) PCT Pub. No.: WO2018/206666
PCT Pub. Date: Nov. 15, 2018

(65) Prior Publication Data
US 2020/0053673 A1 Feb. 13, 2020

Related U.S. Application Data

(60) Provisional application No. 62/505,506, filed on May 12, 2017.

(51) Int. Cl.
*H04W 56/00* (2009.01)
*H04L 27/26* (2006.01)
*H04J 11/00* (2006.01)

(52) U.S. Cl.
CPC ....... *H04W 56/001* (2013.01); *H04L 27/2655* (2013.01); *H04L 27/2671* (2013.01); *H04L 27/2672* (2013.01); *H04J 2011/0096* (2013.01)

(58) Field of Classification Search
CPC ....... H04J 2013/0096; H04J 2013/0055; H04J 2013/0062; H04L 27/2672; H04L 27/2655; H04W 56/001
See application file for complete search history.

(56) References Cited

U.S. PATENT DOCUMENTS

2006/0104257 A1   5/2006   Laroia et al.
2007/0140323 A1*  6/2007   Patel .................. H04L 27/2695
                                                    375/149

(Continued)

FOREIGN PATENT DOCUMENTS

WO     2016045695 A1    3/2016

OTHER PUBLICATIONS

International Search Report and Written Opinion dated Aug. 6, 2018 for International Application No. PCT/EP2018/062046 filed on May 9, 2018, consisting of 8-pages.

(Continued)

*Primary Examiner* — Omer S Mian
(74) *Attorney, Agent, or Firm* — Christopher & Weisberg, P.A.

(57) ABSTRACT

A method is performed by a wireless node in a wireless communication network for receiving a reference signal. The method includes collecting a first set of samples of the received signal in time domain, transforming the first set of samples into frequency domain, forming a plurality of hypotheses including a set of hypotheses for time offset of the received signal and/or a set of hypotheses for frequency offset of the received signal, correlating the frequency domain samples of the received signal with at least a subset (Continued)

of the plurality of hypotheses, and selecting a hypothesis based on the correlation, wherein the selected hypothesis corresponds to a synchronisation of the received signal such that the synchronisation is achieved. A wireless communication device, a network node, and computer programs for implementing the method are also described.

12 Claims, 5 Drawing Sheets

(56) References Cited

U.S. PATENT DOCUMENTS

| | | | |
|---|---|---|---|
| 2011/0026649 A1 | 2/2011 | Lipka et al. | |
| 2013/0287153 A1* | 10/2013 | Sahlin | H04L 1/0036 375/346 |
| 2017/0317816 A1* | 11/2017 | Lei | H04J 13/10 |
| 2020/0314908 A1* | 10/2020 | Hwang | H04B 7/02 |

OTHER PUBLICATIONS

EPO Communication dated Oct. 21, 2021 for Patent Application No. 18723828.2, consisting of 8-pages.
Chinese Office Action and English Summary dated Dec. 15, 2021 for Application No. 201880029753.1, consisting of 9 pages.
3GPP TSG-RAN WG1 #78 R1-143044; Title: A Consideration of OFDM vs. SC-FDMA based on PSS-structured D2DSS; Source: ITRI; Agenda Item: 7.2.3.3.2; Document for: Discussion and Decision; Location and Date: Dresden Germany, Aug. 18-22, 2014, consisting of 9 pages.

\* cited by examiner

WIRELESS COMMUNICATION DEVICE, NETWORK NODE, METHOD AND COMPUTER PROGRAM FOR ACHIEVING SYNCHRONIZATION

CROSS-REFERENCE TO RELATED APPLICATIONS

This application is a Submission Under 35 U.S.C. § 371 for U.S. National Stage Patent Application of International Application No.: PCT/EP2018/062046, filed May 9, 2019 entitled "WIRELESS COMMUNICATION DEVICE, NETWORK NODE, METHOD AND COMPUTER PROGRAM FOR ACHIEVING SYNCHRONIZATION," which claims priority to U.S. Provisional Application No. 62/505,506, filed May 12, 2017, entitled "WIRELESS COMMUNICATION DEVICE, NETWORK NODE, METHOD AND COMPUTER PROGRAM FOR ACHIEVING SYNCHRONISATION," the entireties of both of which are incorporated herein by reference.

TECHNICAL FIELD

The present invention generally relates to a wireless communication device, a network node, methods and computer programs for achieving synchronisation. In particular, the invention relates to forming hypotheses for time offset and/or a set of frequency offset of a received, sampled and transformed signal, correlating in frequency domain, and thereby finding a hypothesis such that synchronisation is achieved.

BACKGROUND

In order to connect to a wireless communication network or to detect or measure signals from a network node, a device needs to acquire network synchronisation. This entails adjusting the frequency of the device relative the network node, and for finding the proper timing of the received signal from the network node. Similar issues may apply for a network node for proper reception from a wireless communication device where frequency drift and/or improper timing otherwise may jeopardize uplink communication.

In legacy cellular communication systems, such as the Long Term Evolution (LTE), cell synchronisation is the very first step when the wireless communication device, referred to as user equipment (UE), wants to access the system or camp on a cell. From this, the UE acquires physical cell identity (PCI), time slot and frame synchronisation, which will enable the UE to read system information blocks from a particular network. The UE will tune its radio by turning to different frequency channels depending upon which bands it is supporting. The UE is supposed to first find a primary synchronisation signal (PSS) which in the legacy system is located in a last OFDM symbol of a first time slot of a first subframe (subframe 0) of a radio frame. This enables the UE to be synchronised on subframe level. The PSS is in the legacy system repeated in subframe 5, which means that the UE is synchronised on 5 ms basis since each subframe is 1 ms. From the PSS, the UE is also able to obtain a physical layer identity (0 to 2). In the next step, the UE finds a secondary synchronisation signal (SSS). SSS symbols are in the legacy system also located in the same subframe as the PSS but in the symbol before the PSS. From the SSS, the UE is able to obtain a physical layer cell identity group number (0 to 167). Using the physical layer identity and the cell identity group number, the UE is now able to know the PCI for this cell. In LTE, 504 physical layer cell identities are allowed and are divided into unique 168 cell layer identity groups where each group consist of three physical layer identity. As mentioned earlier, the UE detects physical layer identity from the PSS and physical layer cell identity group from the SSS. Once the UE knows the PCI for a given cell, it also knows the location of cell reference signals, which are used in channel estimation, cell selection/reselection and handover procedures.

Thus, this legacy system, i.e. in LTE, utilizes three sequences of the primary synchronisation signal (PSS), which together with the subsequent secondary synchronisation signal (SSS) allow the UE to properly and efficiently determine the Physical Cell Identity (PCI) of the transmitting cell. In particular, the time/frequency (T/F) synchronisation obtained from time domain detection of PSS allows SSS to be detected efficiently in the frequency domain. This is a viable solution in many single purpose networks such as LTE. LTE was mainly designed for providing Mobile Broadband (MBB) services to data intensive smartphones, tablets and laptops. Thus, the need for network configurability is, somewhat simplified, limited to network bandwidth, and PCI, in order for a UE to distinguish between different cells. For example, most broadcast signaling is standardized to be located in central 6 resource blocks.

In coming cellular communication systems, more flexibility is demanded, and the rather straightforward rules as demonstrated for the legacy system above may not be feasible. For a radio access technology (RAT) aimed at more diverse usage scenarios, such as the New Radio (NR) which is a part of a $5^{th}$ generation (5G) system currently being standardized by $3^{rd}$ Generation Partnership Project (3GPP), it may be desirable to support a more flexible network configuration. For example, NR will be used in a much wider range of applications than LTE. For example, also specialized NR networks, e.g., local, low latency factory networks or vehicular support networks, may co-exist with a wide area network (WAN) providing mobile broadband coverage. However, the different networks may require very different initial access configuration features to perform as intended.

Primary synchronization signal (PSS) allows detection of a signal transmitted from a NW node in the presence of a high frequency offset, up to tens of ppm, and unknown symbol and frame timing. PSS thus provides a network timing reference and a coarse frequency reference. The time/frequency (T/F) estimation is commonly implemented as a time domain sliding matched filtering operation with regard to different reference sequence and frequency offset hypotheses. A peak at the matched filter output indicates a presence of a PSS and the relevant time and frequency offsets yield the required alignment parameters. 3GPP has selected Zadoff-Chu sequences as PSS signals in LTE and these may also be selected in other systems.

The many possible network configurations in the NR RAT may mean that not all nodes that transmit data will be transmitting unique PSS and SSS signals, or that these signals are not received with sufficient accuracy by the UE. In some cases, the synchronization signals may be transmitted using the single-frequency network (SFN) approach whereby the estimated T/F offsets may be inaccurate for some nodes included in the SFN transmission set. In other cases, certain nodes may not be configured to transmit synchronisation signals at all. In yet other cases, the transmitted PSS and SSS signals may be interfered by strong beam-formed signal transmissions.

Given the possible issues demonstrated above, there is a desire to efficiently provide at least a coarse synchronisation for enabling at least further signal measurements properly.

SUMMARY

The invention is based on the Inventors' understanding that, by observing a reference signal which is already present, and doing this in frequency domain where signal processing can be efficiently performed with available processing power, at least a coarse synchronisation can be achieved using signals that are not specially designed for synchronization purposes without excessive load on receiver and processing means.

According to a first aspect, there is provided a method performed by a wireless node in a wireless communication network for receiving a reference signal. The method comprises collecting a first set of samples of the received signal in time domain, transforming the first set of samples into frequency domain, forming a plurality of hypotheses including a set of hypotheses for time offset of the received signal and/or a set of hypotheses for frequency offset of the received signal, correlating the frequency domain samples of the received signal with at least a subset of the plurality of hypotheses, and selecting a hypothesis based on the correlation, wherein the selected hypothesis corresponds to a synchronisation of the received signal such that the synchronisation is achieved.

The wireless node may be any of a wireless communication device and a network node.

The method may comprise zero-padding the collected samples before the transforming of the samples.

The collecting and transforming of samples may be made based on a preliminary time and/or frequency synchronisation assumption. The preliminary time and/or frequency synchronisation assumption may be based on a coarse synchronisation achieved through acquired synchronisation signal block information. The subset of hypotheses may form a search range. The search range may be based on the preliminary time and frequency synchronisation assumption. The search range may be based on information received from a network node of the cellular communication system. Alternatively, the search range may be based on information pre-defined for the cellular communication system. The preliminary time synchronisation assumption may in any alternative be based on timing advance information on which time search range is based.

The method may comprise collecting a second set of samples in time domain of the received signal with an offset corresponding to a fraction of a symbol time with relation to the first set of samples, and performing similar processing of the second set of samples as the first set of samples, wherein the selecting of the hypothesis may be made among correlations made for both the sets of samples such that the synchronisation is achieved for a wider time search range. The fraction of the symbol time may correspond to a half symbol time or less.

The collecting of samples may be made such that a channel state information reference signal, CSI-RS, of the received signal is included in the samples.

The collecting of samples may be made such that a sounding reference signal, SRS, of the received signal is included in the samples.

According to a second aspect, there is provided a wireless communication device comprising a transceiver and a processor, where the wireless communication device is arranged to perform the method according to the first aspect.

According to a third aspect, there is provided a network node of a cellular communication network comprising a transceiver and a processor, where the network node is arranged to perform the method according to the first aspect.

According to a fourth aspect, there is provided a computer program comprising instructions which, when executed on a processor of a wireless communication device, causes the wireless communication device to perform the method according to the first aspect.

According to a fifth aspect, there is provided a computer program comprising instructions which, when executed on a processor of a network node, causes the network node to perform the method according to the first aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

In New Radio (NR) (part of the 5G system currently being standardized by 3GPP), the synchronisation procedure will be performed using several signals:

Primary synchronisation signal (PSS) that allows for network detection with a high frequency error, up to tens of ppm. Additionally, PSS provides a network timing reference. 3GPP has selected Zadoff-Chu (ZC) sequences as PSS signals. One interesting property of these are that by careful selection of two ZC sequences, the same correlation sequence may be used for detection, adding negligible complexity.

Other sequences with low autocorrelation, e.g. pseudo-random sequences, may be used as well in the approach suggested in this disclosure. For example, polyphase sequences or other sequences with low autocorrelation such as the Barker sequence, maximum length sequence (m-sequence), etc., as well as other constant amplitude zero autocorrelation (CAZAC) sequences than the ZC sequence.

Secondary synchronisation signal (SSS) that allows for more accurate frequency adjustments and channel estimation while at the same time providing fundamental network information in the form of a locally unique cell identity (also referred to as the Physical Cell Identity, PCI).

Physical broadcast channel (PBCH) that provides a subset of the minimum system information for random access (sometimes referred to as Master Information Block, MIB).

Figure 1:
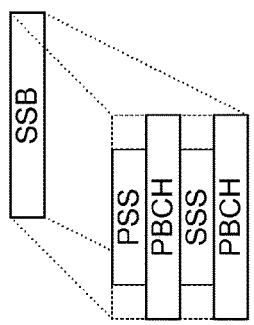
FIG. 1 schematically illustrates synchronisation signal block.
Figure 2:
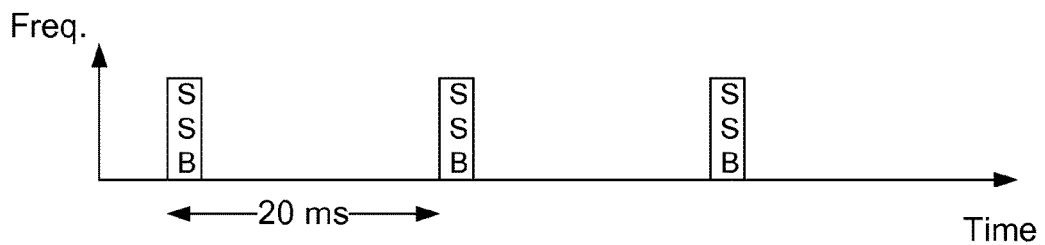
FIG. 2 schematically illustrates periodicity of provision of synchronisation signal blocks.

A synchronisation signal block (SSB) comprises the above signals. FIG. 1 schematically illustrates one possible structure of an SSB. FIG. 2 is a time/frequency diagram which illustrates an example on repeated transmission of the SSB. In FIG. 2, it is illustrated that the SSB periodicity may be 20 ms, but can be sent with another periodicity, e.g. 10 ms, 40 ms, 80 ms or the like. Here, it can be noted that the periodicity of the SSB may be one parameter which is indicated by a network access signaling configuration information as demonstrated below. In brief, the network access signaling configuration means the time, frequency, beam, format, encoding, etc. which is used for signals used for providing access to the network.

Here, the information about the network access signaling configuration provided by the sequence selection of the initial synchronisation signal may not provide all information about the network access signaling configuration, but enough information such that the wireless communication device need not do a completely blind search and is facilitated to find further signaling, e.g. further synchronisation signals, where more information about network access signaling configuration may be given, as well as other network configuration parameters. Thus, the selection of sequence demonstrated below may be made from a subset of parameters of the network access signaling configuration. This will be easier understood from examples given below.

It can also be noted that the illustrated SSB has a certain bandwidth coverage, as illustrated by the extension along the frequency axis. The SSB bandwidth may be fixed for respective used frequency band, e.g. 4.32 MHz for carrier frequencies below 6 GHz and a higher bandwidth for carrier frequencies above 6 GHz. The configuration of this may also be indicated by the network access signaling configuration information demonstrated below.

A physical downlink shared channel (PDSCH) may provide remaining parts of the system information (PDSCH$_{SIB}$. PDSCH$_{SIB}$ may be transmitted in resources indicated by PBCH, or in a resource indicated by PDCCH$_{SIB}$, which in turn is indicated by the PBCH.

Depending on the deployment, beamforming may be used to distribute the SSB over the network (NW) coverage area. Multiple SSBs are then aggregated to form an SSB burst where each SSB instance is beamformed in a certain direction, either to ensure coverage or to provide beam finding support for subsequent link establishment.

Figure 3:
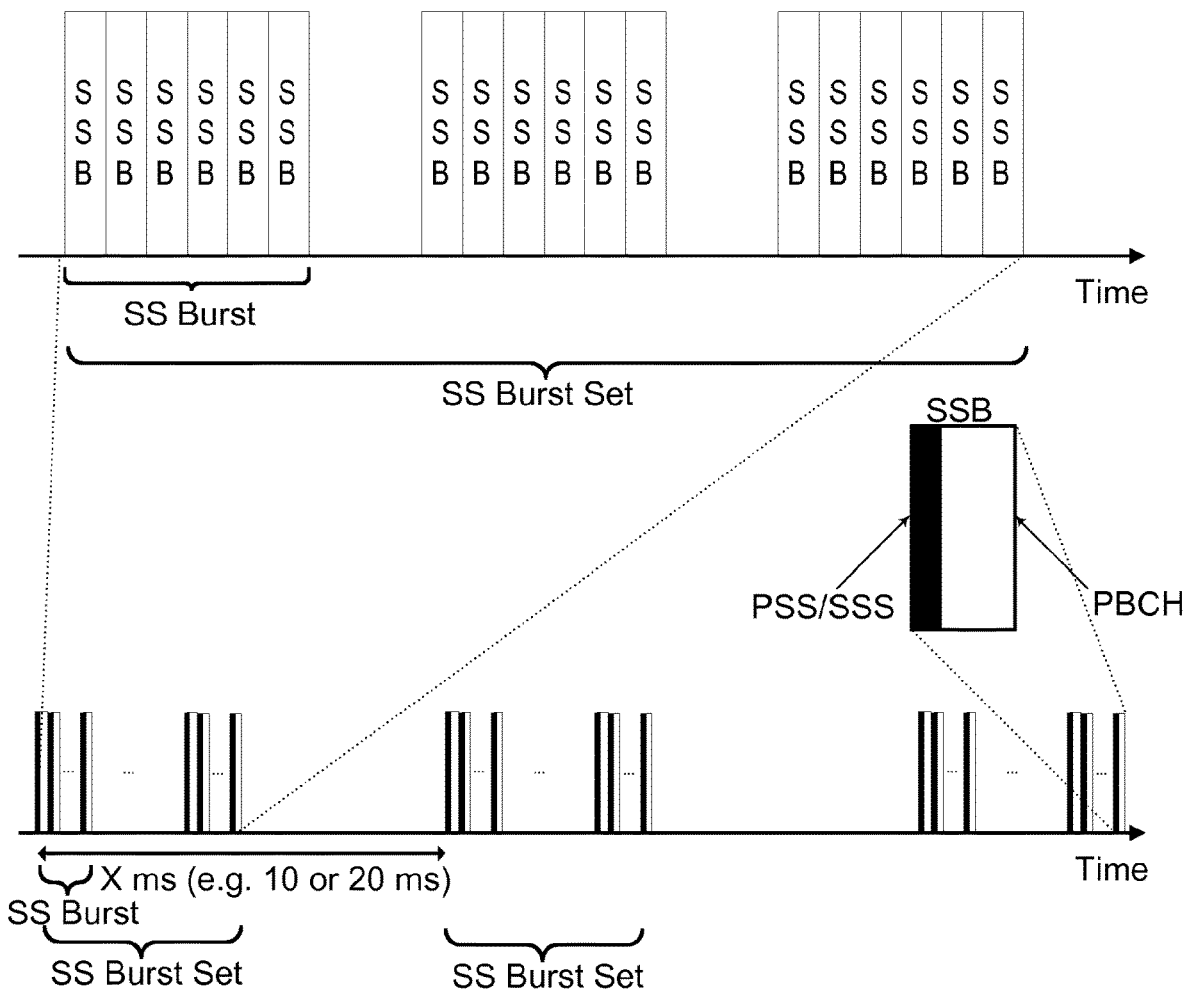
FIG. 3 schematically illustrates overall provision of synchronisation signal blocks.

As mentioned above, for the purpose of improving coverage (or beam finding), the SSB may be transmitted using beamforming in the form of a beam sweep including multiple beams which together cover the desired area. Another means for improving coverage is repetition of wide (even omni-directional) beam transmissions. Both beam sweeping and repetition involves multiple transmissions. A number of SSB transmissions may be lumped together, i.e. transmitted in a tight series, denoted synchronisation signal bursts (SS Burst). A "SS Burst Set" may also be formed, where a SS Burst Set is a set of SS Bursts, typically with some non-zero interval between successive SS Burst transmissions as illustrated in FIG. 3. A SS Burst may for instance consist of the beam transmissions of a full beam sweep. However, there may also be reasons for not including a full beam sweep in a SS Burst, for instance if the number of beams in the sweep is comparably high and a full beam sweep would take longer time than allowed or desired for a SS Burst. In such a case, the beam sweep may be divided into multiple SS Burst, e.g. forming a SS Burst Set. In any case, the recurrence interval of the same beam in a sweep is preferably fixed, irrespective of whether the SS Burst Set consists of multiple or a single SS Burst. This fixed recurrence interval may for example be 10 ms or 20 ms.

The network access signaling configuration choices may for example be affected by carrier bandwidth, ultra-reliable low latency communication (URLLC) and Internet of Things (IoT) support, quality of service (QoS), e.g. latency, requirements, etc.

In LTE, channel state information reference signal (CSI-RS) is primarily used for evaluating quality of different beamforming and multi-layer transmission alternatives towards a UE. A CSI-RS resource is formed by aggregating one or more CSI-RS units in one or more OFDM symbols within a slot. A CSI-RS unit consists of a resource element (RE) or a pair of adjacent REs (or adjacent subsampled REs) within the same OFDM symbol. The number of ports may be less than or equal to the number of REs in the aggregated resource. A CSI-RS resource is UE-specifically configured and can have 1,2,4,8,12,16,20,24,28, or 32 ports. Its periodicity is {5,10,20,40,80} ms. CSI-RS spans full system bandwidth. For 1 and 2-port measurements, 2 REs in 2 adjacent OFDM symbols (CDM-T) are used, where two ports are separated using orthogonal cover code (OCC). Arbitrary CSI-RS subframe grid offset is supported. CSI-RS is configured by the serving cell to a UE, providing a T/F reference. The CSI-RS symbol sequence depends on slot index (0-19) and symbol index in slot. The sequence generator is initialized with cell ID (default) or a virtual cell ID (if configured by RRC) which makes them distinguishable from other cells' or users' CSI-RS.

Herein, the reference to T/F should be construed to mean time, frequency, or time and frequency.

Figure 5:
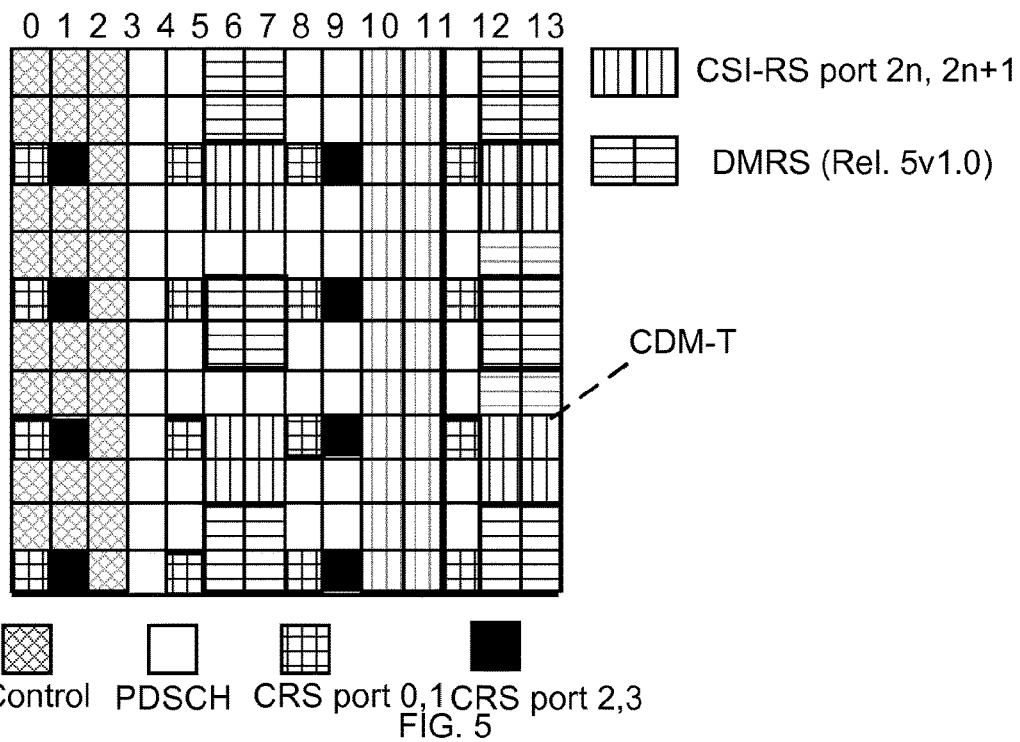
FIG. 5 schematically illustrates an example of reference signals in a physical resource block.
Figure 6:
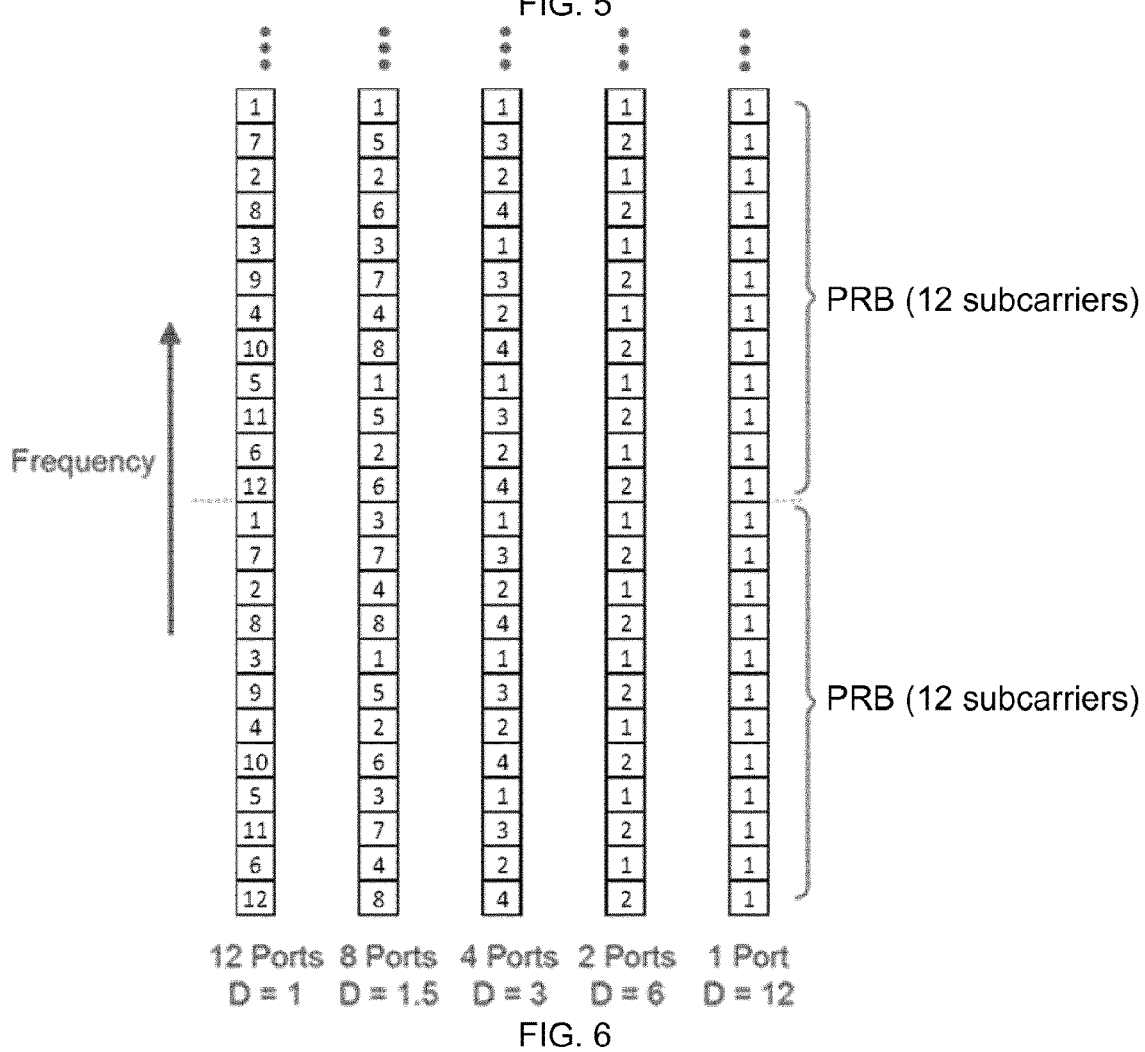
FIG. 6 schematically illustrates an example of single-symbol resource element mapping pattern for different port reference signal resources.

CSI-RS in NR will have a fundamentally LTE-like design. FIG. 5 schematically illustrates an example of reference signals in an LTE physical resource block. Some differences compared with LTE agreed so far include flexible BW, 1, 2, or 4 symbol-transmission, up to 12 CSI-RS resources per slot. CSI-RS symbols contain only CSI-RS, and CSI-RS may be configured in aperiodic, semi-persistent, or periodic manner. A possible CSI-RS design for NR is illustrated in FIG. 6 and described in contribution to 3GPP by Ericsson with reference RAN1 #88: R1-1702690. In NR, it is desirable to minimize the number of OFDM symbols occupied by a CSI-RS resource. This is motivated by the fact that NR supports slots with as few as 7 symbols, which is half the number of symbols than in an LTE transmission time interval (TTI), and several of these symbols are already occupied by downlink control, uplink control, demodulation reference signal (DMRS), and guard symbols in the case of time division duplex (TDD). This leaves relatively few symbols for CSI-RS. Another design goal is that NR supports densities at least as large as the default density D of D=1 resource element (RE)/port/radio bearer (RB) used in LTE, thus enabling channel estimation performance on par with LTE. To satisfy these design goals, the RE mapping pattern for 1, 2, 4, 8, and 12 port CSI-RS resources may consist of at least a single OFDM symbol. FIG. 6 shows such a single-symbol RE mapping pattern for the case when all 12 REs within every PRB are occupied by CSI-RS symbols. When a physical resource block (PRB) consists of 12 subcarriers, the goal of supporting density D=1 RE/port/RB is satisfied for the case of the 12-port CSI-RS resource. The port number assignment scheme used in FIG. 6 keeps the port numbers corresponding to the two different polarizations of the same dual-polarized antenna element in adjacent REs in frequency (e.g., (1,7), (2,8), . . . for the 12 port case). Such an assignment scheme may be desirable when it comes to multi-symbol CSI-RS resources, e.g., for 16, 24, and 32 ports. Other port number assignment schemes are of course possible, and this issue should be studied further. As can be seen in FIG. 6, the assignment of port numbers to a fully occupied PRB leads to densities D>1 for CSI-RS resources with fewer than 12 ports. This may be beneficial for NR where the sub carrier spacing can become quite large (up to 480 kHz). For highly frequency selective channels, larger densities may be required to ensure that the channel for each port is sampled sufficiently often within the channel coherence bandwidth to ensure good channel estimation performance.

The CSI-RS sequence is generated based on a seed value, as in LTE. It is likely that the seed may be based on the physical cell identity (PCI) or on a virtual ID. The use of the virtual ID in the sequence generation will be central in the usage of the CSI-RS for active mode mobility. The CSI-RS in NR will be designed to efficiently support analog beam sweeping. Some additional uses compared to LTE may be for fine T/F tracking, and for radio link monitoring (RLM).

In active mode, the connection of a moving UE must be seamlessly handed over as the UE moves across the different cell coverage areas in the network. Handover is the process of transferring an ongoing connection of a UE from one node (the serving) to another node (the target), or from one cell to another within the same node. This is done to accomplish a transparent service or service continuity over a larger area. The handover should happen without any loss of data and preferably with no interruption.

In legacy cell-based systems like LTE, the cell-specific reference signals (CRSs) have been used for mobility measurements. These are broadcasted in all neighbour cells in an always-on manner over the entire bandwidth, regardless of the presence or position of UEs in the system. The CRS are easy to measure and yield consistent results, but static CRS signaling leads to high resource usage, power consumption and constant inter-cell interference generation in the downlink. All base stations continuously transmit pilot signals that UEs in own and neighbour cells use to estimate the target cell quality. This is also true in GSM (BCCH), WCDMA (CPICH) and in WiFi (beacon). Each UE performs periodic measurements and reports the measurement results to the network when certain reporting conditions are met (periodic or event based). If it is detected that the serving cell quality is getting close to another candidate cell power, a more detailed measurement process or a handover procedure may be initiated.

In some configurations, initial access signals (SSB and associated signals like PSS/SSS), if transmitted at a sufficient rate, may also be used for active mode mobility measurements. They allow estimating the link qualities with regard to the candidate cells and reporting back to the network.

Modern cellular systems, e.g. 5G NR systems, will use advanced antenna systems containing large antenna arrays for data transmission. With such antenna arrays, data signals will be transmitted in narrow beams to increase signal strength in some directions, and/or to reduce interference in other directions. In such systems, serving and target node or cell identities are often no longer sufficient for maintaining seamless connections during inter-node handover. Handover management between narrow beams in neighbouring base stations becomes a necessity, and the serving base station also needs to decide if a beam switch or beam update is necessary within the own cell. The serving link may thus effectively be the beam through which the base station is currently communicating with the UE, and the beam it will hand over or switch to becomes the target link.

In a beam-based system like NR, it is desired to avoid excessive static DL RS signaling, so instead the NW may turn on special mobility reference signals (MRS) only when needed, wither when there are UEs found in a given NW region or, in a UE-specific manner only in relevant candidate beams. It may be done periodically or when the NW determines that a beam update for the UE may be needed, e.g. when decreasing serving beam quality is detected. Each activated beam transmits an MRS that carries the beam identity.

In such a system, various MRS measurement and reporting strategies may be employed. In an LTE-like setup, the UE may be continuously monitoring the received sample stream for the presence of MRS. When some event criterion is fulfilled, e.g. any MRS is detected with signal quality exceeding a threshold, the UE would report the received beam ID and signal quality to the network. The reports would be used for mobility decisions and for building an ANR database at AN or beam resolution level. In an alternative 5G-style setup as described in WO 2016/045695 A1, the network triggers MRS measurements by transmitting a measurement command via control signaling, e.g. when degrading serving link quality or another reason for initiating mobility measurements is identified. The measurement command may contain reporting instructions and, in some embodiments, an explicit list of MRS to measure. The serving and/or other candidate ANs reserve UL resources for receiving measurement reports in the UL.

Transmission receive points (TRPs) transmit unique CSI-RSs using different precoding/beamforming configurations. In 3GPP, it has been agreed that CSI-RS will be used for intra-TRP beam management. The UE measures the received CSI-RS quality and reports the best beams' identities and qualities to the network.

It has also been agreed that CSI-RS-like signal structures may be used as an MRS for active mode mobility (AMM) measurements, in addition to the PSS/SSS signals. In one solution, the PSS from a possibly T/F-misaligned candidate cell is used to obtain sufficient T/F synchronization to that cell, whereupon CSI-RS measurements can be performed in the F-domain using the acquired T/F sync parameters.

A motivation for using CSI-RS for AMM may be e.g. one of the following:
  Inter-TRP mobility in multi-TRP cells where PSS/SSS is transmitted as SFN
  Desired beam mobility resolution is higher than PSS/SSS beam sweep resolution
  Wide-band measurements desired for improved fading robustness in moderately dispersive environments or to improve measurement accuracy.
  In contrast to PSS/SSS, CSI-RS can be dynamically turned on and off and configured according to suitable parameters (period, bandwidth, number of unique links supported, etc.) by the NW based on the presence of UEs and their mobility needs.

Quasi co-location (QCL) relationship refers to a network transmission arrangement where two or more signals are transmitted in a way that the UE can assume similar second-order characteristics for the received signals, e.g. Doppler shift and spread, time delay, delay spread, direction(s) of arrival, etc. The complex channel characterization (channel coefficients) need not be the same.

Consider candidate CSI-RS signals that a UE is to measure and that are T/F-aligned with the UE's current T/F references. The current T/F references may be achieved by tight network synchronisation, by relying on the SSB (PSS/SSS) from the same TRP, generally an SSB that is QCL with the CSI-RS, or any other assumption. In this disclosure, the expression "preliminary time and/or frequency synchronisation assumption" means some information about time synchronisation, frequency synchronisation, or time and frequency synchronisation. When the T/F alignment is fairly precise, CSI-RS can be efficiently measured by the UE in the F-domain. However, if the candidate CSI-RS are received non-negligibly T/F misaligned, e.g. with a time offset by more than the CP length, measurement quality starts to deteriorate. At larger T/F offsets, it may become impossible to even detect the CSI-RS signals for beam management or AMM measurements. Such misalignment may occur when the candidate NW nodes are not tightly synchronized and/or large propagation path length differences exist between different candidate beam signals.

Some examples of problematic situations for AMM measurements are deployments with ms-level or coarser synchronised TRPs or large inter site distances (ISDs). If a matching, suitably QCL, SSB is not available for the candidate beam, e.g. due to interference from high-gain data transmission, a hidden node scenario, single frequency network (SFN) transmission of SSB, or other deployment choices or usage scenarios, CSI-RS from such TRPs may not be usable for beam quality estimation by the UE. For intra-TRP beam management, conventional CSI-SR do not support propagation scenarios where distinct far reflections are captured by some beams but not others, transmitted from the same TRP.

Figure 4:
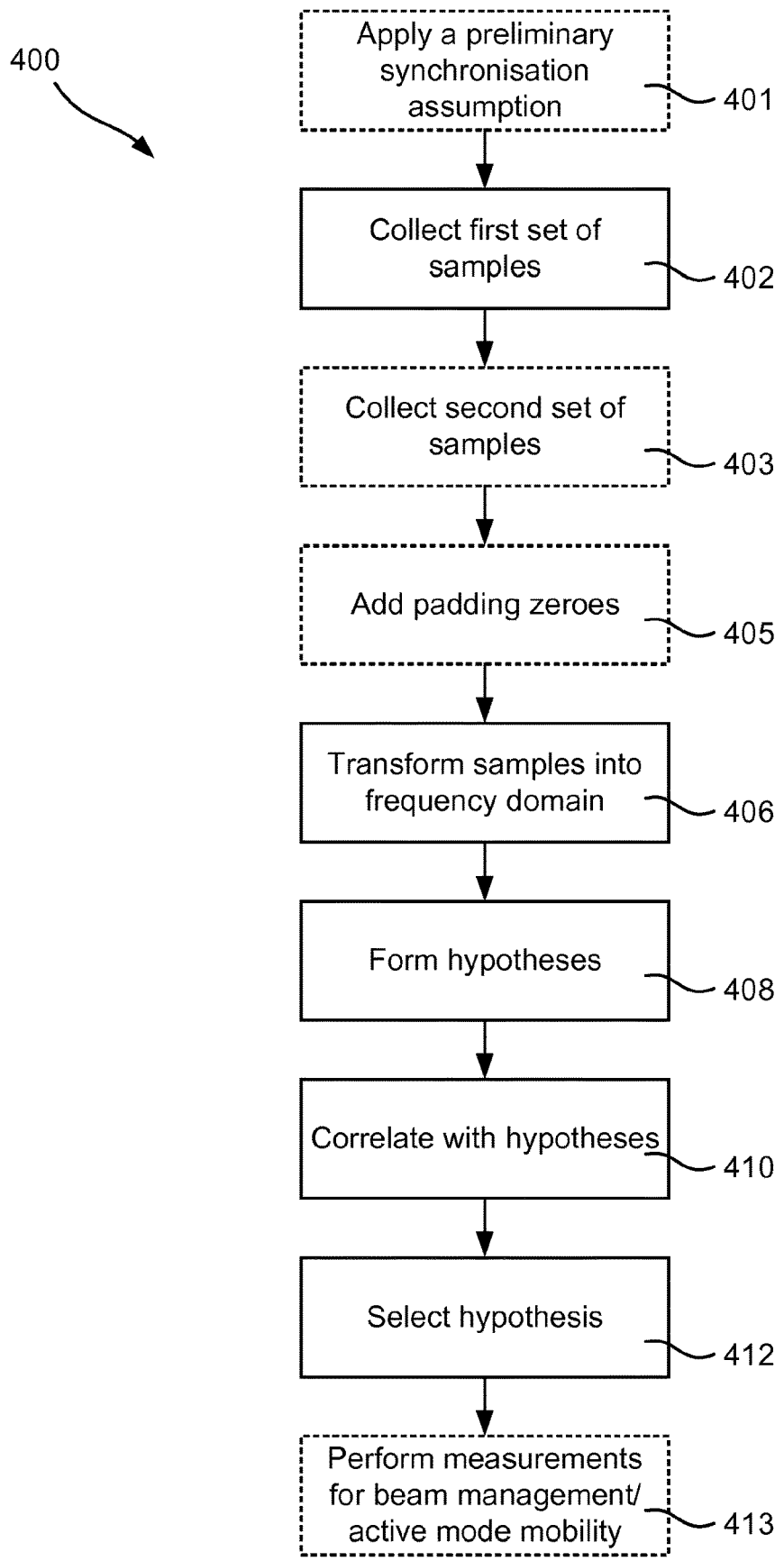
FIG. 4 is a flow chart illustrating methods according to embodiments.

FIG. 4 is a flow chart schematically illustrating a method 400 for the approaches demonstrated herein. It should be noted that FIG. 4 is applicable both for the method of the wireless communication device and the method for the network node, as will be demonstrated below.

In brief, a receiving entity, e.g. a wireless communication device or a network node, may apply 401 a preliminary synchronisation assumption, as discussed above. A search range may also be determined, e.g. from what is specified for the communication network or what has been provided for through signaling from one or another network node of the communication network, or by estimation of expected maximum misalignment. The search range may be determined from for example inter-TRP local oscillator stability, timing alignment accuracy, inter-site distance, etc. The receiving entity collects 402 a first set of samples of the received signal. The samples may be collected 402 based on the preliminary synchronisation assumption. The samples are then transformed 406 into frequency domain, and a multitude of hypotheses with different T/F offsets are formed 408. The forming 408 of hypotheses may be made at any time, and may be pre-stored. The forming 408 may thus include selecting among stored hypotheses which hypotheses to use for the specific moment. The hypotheses to use may be determined as a subset based on current reception mode in the standard, or by an explicit link identity (ID), e.g. cell ID or beam ID, provided by the network. A full set of all hypotheses defined for the signal in question may also be used. Each hypothesis may comprise a sequence to compare with transformed samples and data corresponding to the T/F offsets associated with the hypothesis. One reasonable implementation would be to use the current serving node T/F references, as the assumption, for data collection and transforming, without regards to any search range, and then use any available search range information to limit the hypothesis set.

The transformed samples are then correlated 410 with the hypotheses, wherein the hypothesis fitting best with the received signal, or at least with a sufficiently good fit, can be selected 412. From this selected hypothesis, which is associated with its T/F offsets, a synchronisation is obtained, and the receiving entity may adapt its reception accordingly, e.g. to perform 413 measurements for beam management or AMM. Optionally, the receiving entity may collect also a second set (and third set, etc.) of samples with an offset corresponding to a fraction of a symbol time with relation to the first set of samples to achieve a larger search range for time offsets. Also optionally, the collected samples may be zero-padded 405, i.e. zero-values are added to the sample sequence, which will result in an interpolated, or oversampled, sequence in frequency domain after transforming 406. For example, the zero-padding 405 may be made such that the transformed sequence fits the sequences of the hypotheses. The zero-padding 405 may be made to correspond to desired frequency resolution, e.g. sub-carrier spacing.

For the wireless communication device, i.e. where synchronisation is to be made in the DL, the received CSI-RS signal is sampled 402 and transformed 406 to the F-domain via an FFT using an initial T/F reference, e.g. the serving link T/F-reference. The F-domain signal is then correlated 410 with multiple F-domain reference sequences that model different hypothesized T- and F-offsets applied to one or more transmitted CSI-RS sequences. The sequence and T/F offset hypotheses resulting in largest, or sufficiently large, correlation values are selected 412 as detected link identities and T/F-offset estimates.

The transformed sequence is correlated with the multiple hypothesized reference sequences of the hypotheses to be examined where each sequence depends on three parameters: the transmitted sequence in F-domain, frequency shift, e.g. phase of the oversampled received signal in the F-domain, and time shift, e.g. multiplication with a complex exponential rotation term. Here, processing may be made either according to a polar calculation approach or according to complex values. The correlation may be performed coherently over blocks of the observed reference signal, e.g. CSI-RS, frequency elements within the coherence bandwidth and non-coherently over the coherent blocks.

Some example embodiments for alternative but mathematically equivalent implementations are described below:
Domain where T-offset is applied:
FFT is performed to the T-domain signal with 0-offset, then T-offset hypotheses are applied in F-domain by multiplying transmitted sequence by corresponding rotation terms, or
FFT is performed on T-domain signals, each corresponding to a hypothesized T-offset.
Testing F-offset hypotheses:
The received signal is FFTed after padding, achieving F-domain oversampling, e.g. 16×, while the reference sequences are not oversampled. F-offset hypotheses are tested by selecting appropriate F-sampling phase of the received sequence, or
The received signal may be FFTed with oversampling 1x and the reference sequences generated by FFTing padded versions of the T-domain reference sequences. F-offset hypotheses are tested by selecting appropriate F-sampling phase of the reference sequence.

Obtaining an N times (N×), where N is an integer, oversampled F-domain received or reference signal:
Zero-padding with length (N−1)× and FFTing, or
FFTing the original T-domain signal without zero-padding signal and interpolating, e.g. transversally filtering, in frequency.

The above approach 400 handles timing misalignments from the serving cell timing that are limited to a moderate fraction, e.g. 25%, of the CSI-RS OFDM symbol length. To handle larger offsets, multiple FFT instances may be performed where the timing reference for the FFT is varied at e.g. ½ OFDM symbol steps by collecting 403 the further set(s) of samples.

The hypothesis search space may be limited e.g. by previously estimated T- and F-offset range, and by pre-configured CSI-RS identities, e.g. cell or virtual IDs, to look for.

The approach 400 enables DL link quality measurements using additional reference signals, e.g. CSI-RS, even when the link to be measured is moderately misaligned with regard to the current receiver reference and when an associated traditional initial T-sync signal is not available. For example, AMM measurements may be enabled with better measurement quality and beam resolution, and robust beam management measurements and transparent beam switching, and in a wide range of deployments and transmission scenarios.

For the network node, i.e. where synchronisation is to be made in the UL, the same approach 400 may be applied for using the SRS to obtain synchronisation for specific UE beams.

Further, for the network node angle of the approach, the method may include signaling to the UE a list of candidate sequences, e.g. cell or beam IDs, to look for to reduce the search effort. The network node may also signal the relevant T/F search space, e.g. based on the deployment parameters like inter-TRP local oscillator (LO) stability, timing alignment accuracy, inter-site distance (ISD), etc.

The network node may further narrow down the T/F search space for the UE by observing timing advance (TA) information for the UE. With TA, the network node knows that the UE is located somewhere on an arc centred at the serving TRP with a radius equal to the TA, and width equal at most to the half-power beam width of a sector covering antenna element. If the network node, e.g. a gNB, has knowledge of the GPS co-ordinates of neighbour network nodes, i.e. radio access nodes, it can compute a timing window for each neighbour, and then take the union of all windows as the T-domain search space. If the network node has prior knowledge of a narrow beam direction for the UE, then the network node can reduce the search window even more, since the network node would know more precisely where the UE is on the arc. The network node can then signal this more exact search space information to the UE in a dedicated manner.

To illustrate the approach in practice, consider a specific deployment at 4 GHz with 15 kHz sub-carrier spacing (SCS). The symbol length is then 67 us and the cyclic prefix (CP) length 4.7 us. Then assume an ISD of 3 km and inter-node synchronisation using radio interface-based synchronisation, wherein only the path loss difference contributes significantly to T-offset between received serving link and candidate link signals; the T-offset can be up to ±10 us. Assuming network node LO accuracy of 0.5 ppm and vehicular movement 120 km/h, the maximum F-offset can be 2+2·0.88=3.8 kHz in either direction.

If the targeted F-accuracy is 7% of SCS, i.e. 1.05 kHz, and the T-accuracy 50% of the CP (2.4 us), the T-offset search span includes nine positions and the F-offset span eight positions. Thus, for each candidate sequence, 72 tentative detection operations should be performed. Assuming full-BW CSI-RS and K candidate sequences that the UE attempt to detect, this can be implemented e.g. by the following steps:

collected initial sample sequence of 2048 samples
zero pad to length 16·2048 and FFT to obtain 16× oversampling in frequency
for each of the nine T-offset positions
    generate T-shift representation in frequency
    for each of the K candidate sequences
        multiply length-2048 candidate sequence with the T-shift sequence
        for each of the eight F-offset hypotheses
            sub-sample the 16× oversampled received signal at appropriate phase
            correlate sub-sampled received signal with the references Alternatively, mathematically equivalent implementations may of course be formulated that amount to different orders of looping though the search dimensions and performing sequence multiplications, which becomes evident from demonstration of the steps above.

The approach is designed to support scenarios where the T-offset is comparable to or exceeds the CP length. It works well while maximum T-offset is a moderate fraction of the OFDM symbol length (Tsym). The tolerable offset is limited by several aspects: the desired signal energy is decreased, interfering, i.e. from neighbouring symbol, signal energy is increased, and the rotational term in the F-domain may start limiting the coherence bandwidth. An estimated practical limit for the T-offset uncertainty range, so that the procedure of the invention works robustly, may be approximately 25% of the Tsym.

If the timing uncertainty exceeds the above limit, e.g. due to a deployment with looser inter-node timing alignment, the procedure may be extended by repeating the steps from collecting 402 samples to correlation 412 for additional initial T-offsets, which may be selected e.g. in steps of 0.5 Tsym, considering the assumed 25% T-offset uncertainty range for robust procedure indicated above. This way, at least one tested initial offset will fall within 0.25 Tsym of the actual offset. At every initial offset value, a T-offset range of −0.25 Tsym . . . 0.25 Tsym may be tested to determine the actual T-offset.

By using a non-PSS-like signal, e.g. a signal not incorporating initial sync-related features, preferably for detection of a low number of sequences in the T-domain, synchronisation is obtained using e.g. the CRS via F-domain hypothesis testing. This differs from initial synchronisation and tracking operations traditionally used, and efficient signal processing is performed in F-domain, i.e. with limited sampling, filtering, averaging, etc. in time-domain, to find the synchronisation such that further measurements are enabled.

There are no practically limiting constraints for the supported F-offset range, especially given that the UE already has F-synchronisation towards the serving link.

The approach is usable for beam management to overcome T-offset changes between beams due to capturing long reflections via some beams but not from others. The UE may thus use the transmitted regular CSI-RS structure to successfully measure and report beams that utilize different propagation paths in the environment.

The approach is also usable for AMM measurements using e.g. CSI-RS without additional synchronisation features, for measuring link quality from a misaligned neighbour cell when SSB from that cell is not available, cannot be detected, or does not match the CSI-RS in the QCL sense.

This approach is especially suitable for cases where the NW has pre-configured the UE with a limited set of possible transmitted sequences. If the set of sequences is larger but the latency of measurement reporting is not critical, the UE may record the received samples and perform background computations to test all reasonable sequence to T-offset and F-offset hypothesis combinations when computational resources are available and report to the network once the computations are complete.

The approach 400 has so far been discussed using the DL detection and measurement example by the UE. Similarly, in the UL, the approach 400 enables measurements of UE beam qualities when different UE beams may capture propagation paths with e.g. different path lengths. It also enables UL-based AMM measurements using SRS at additional candidate nodes that are not strictly time-aligned with the UE's serving node.

The approach 400 is thus equally applicable to the UL, where e.g. the SRS transmitted by the UE may be used for timing estimation in related cases. For example, different UE transmit (TX) beams may capture different propagation paths and the timing acquired from physical random access channel (PRACH) transmitted using isotropic or wide-beam beam shapes, or from tracking the previous serving beam, may not be sufficiently QCL with a new UE beam. The SRS in the new beam may then not be properly detected and measured by the TRP. The approach may be used to derive updated T/F references for the new, non-time-aligned beam from its SRS without requiring transmitting a PRACH-like signal specially designed for coarse synchronisation acquisition. Similarly, UL measurement-based AMM for deployments where the ISD is comparable to or exceeds the corresponding CP length may be supported using only SRS as measurement signals.

Figure 7:
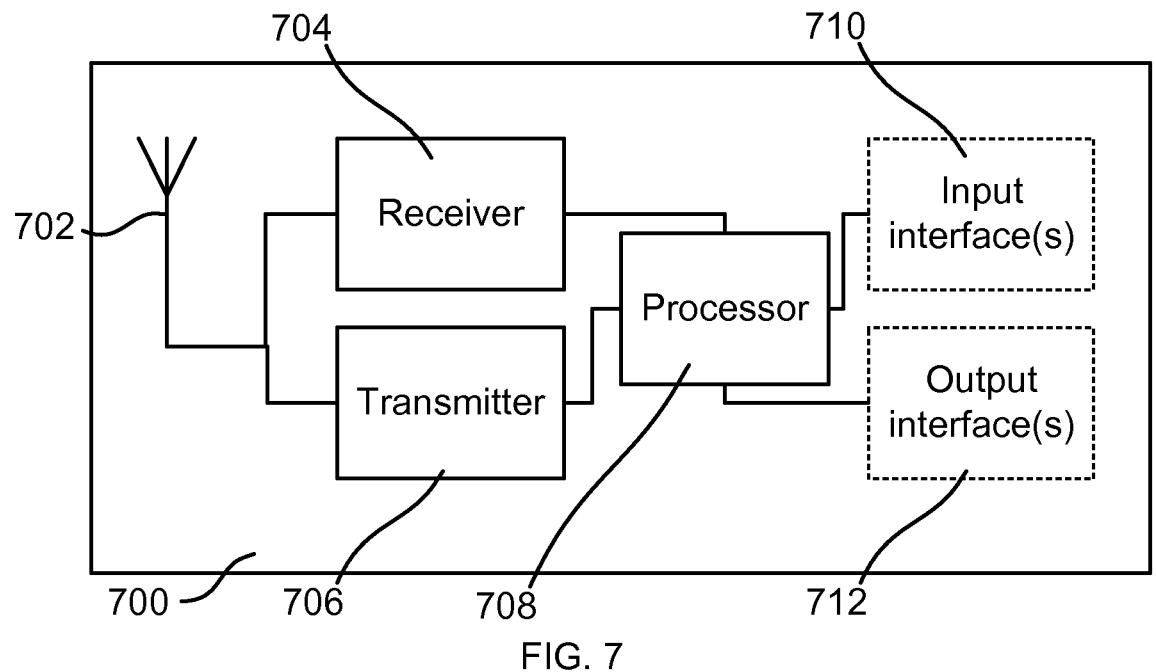
FIG. 7 is a block diagram schematically illustrating a wireless communication device according to an embodiment.

FIG. 7 is a block diagram schematically illustrating a wireless communication device 700 according to an embodiment. The wireless communication device 700 comprises an antenna arrangement 702, a receiver 704 connected to the antenna arrangement 702, a transmitter 706 connected to the antenna arrangement 702, and a processing element 708 which may comprise one or more circuits. Optionally, the wireless communication device 700 comprises one or more input interfaces 710 and one or more output interfaces 712. The interfaces 710, 712 can be user interfaces and/or signal interfaces, e.g. electrical or optical. The wireless communication device 700 is arranged to operate in a cellular communication network. In particular, by the processing element 708 being arranged to perform the embodiments demonstrated with reference to FIG. 4, the wireless communication device 700 is capable of establishing a synchronisation which enables the wireless communication device 700 to for example perform further measurements as discussed above. The processing element 708 can also fulfil a multitude of tasks, ranging from signal processing to enable reception and transmission since it is connected to the receiver 704 and transmitter 706, executing applications, controlling the interfaces 710, 712, etc.

Figure 8:
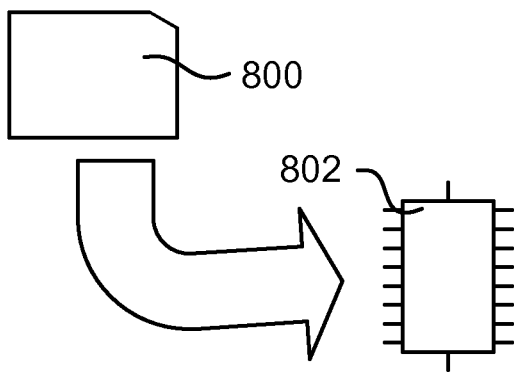
FIG. 8 schematically illustrates a computer-readable medium and a processing device.

The methods according to the present invention are suitable for implementation with aid of processing means, such as computers and/or processors, especially for the case where the processing element 708 demonstrated above comprises a processor handling the synchronisation. Therefore, there is provided computer programs, comprising instructions arranged to cause the processing means, processor, or computer to perform the steps of any of the methods according to any of the embodiments described with reference to FIG. 4. The computer programs preferably comprise program code which is stored on a computer readable medium 800, as illustrated in FIG. 5, which can be loaded and executed by a processing means, processor, or computer 802 to cause it to perform the methods, respectively, according to embodiments of the present approach, preferably as any of the embodiments described with reference to FIG. 4. The computer 802 and computer program product 800 can be arranged to execute the program code sequentially where actions of the any of the methods are performed stepwise, or perform the actions according to a real-time scheme. The processing means, processor, or computer 802 is preferably what normally is referred to as an embedded system. Thus, the depicted computer readable medium 800 and computer 802 in FIG. 8 should be construed to be for illustrative purposes only to provide understanding of the principle, and not to be construed as any direct illustration of the elements.

Figure 10:
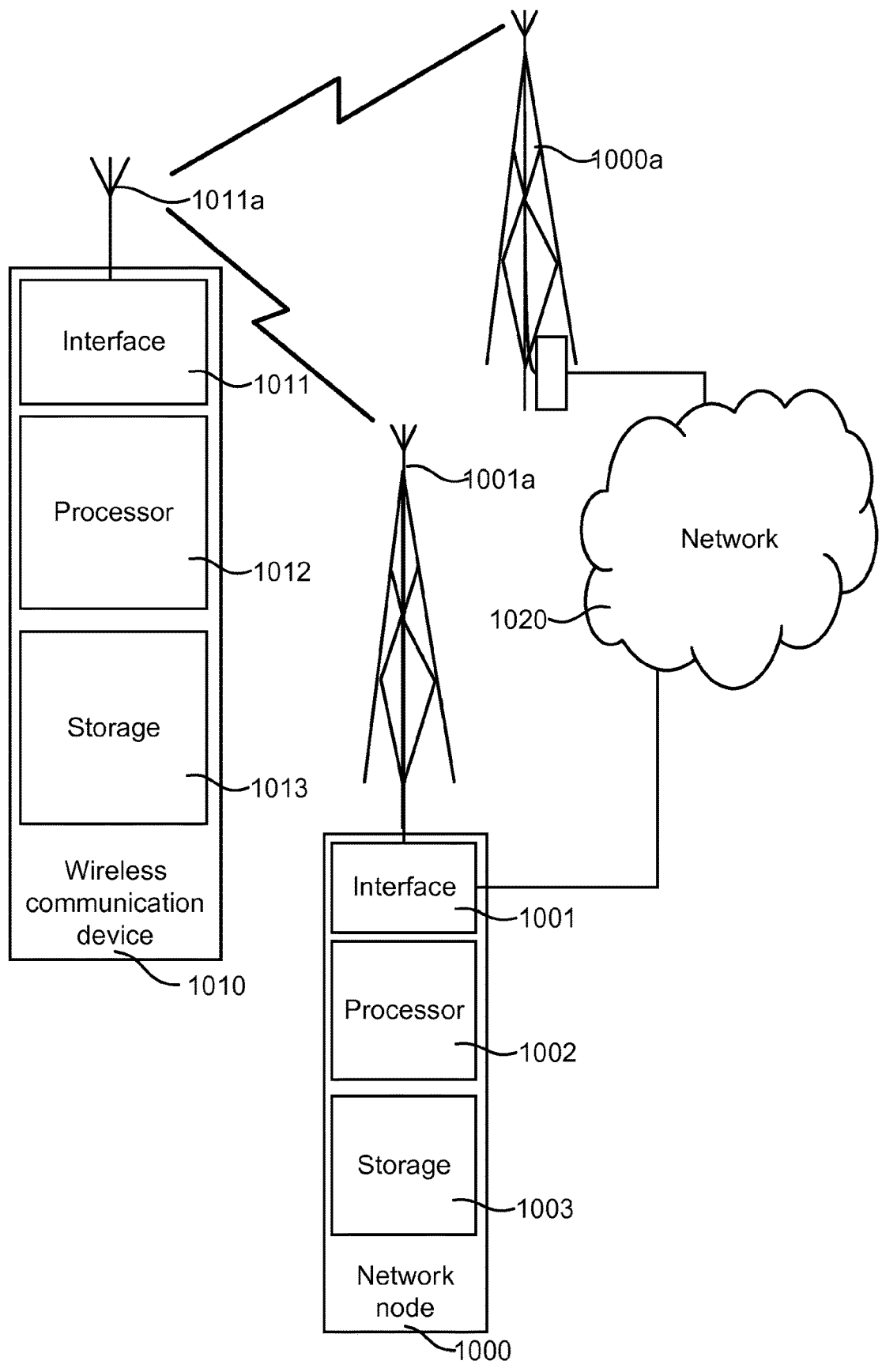
FIG. 10 illustrates parts of a cellular communication network including network nodes and a wireless device.

FIG. 10 illustrates a wireless network comprising network (NW) nodes 1000 and 1000a operating as radio access network nodes and a wireless communication device 1010 with a more detailed view of the network node 1000 and the communication device 1010 in accordance with an embodiment. For simplicity, FIG. 10 only depicts core network 1020, network nodes 1000 and 1000a, and communication device 1010. Network node 1000 comprises a processor 1002, storage 1003, interface 1001, and antenna 1001a. Similarly, the communication device 1010 comprises a processor 1012, storage 1013, interface 1011 and antenna 1011a. These components may work together in order to provide network node and/or wireless communication device functionality as demonstrated above. In different embodiments, the wireless network may comprise any number of wired or wireless networks, network nodes, base stations, controllers, wireless communication devices, relay stations, and/or any other components that may facilitate or participate in the communication of data and/or signals whether via wired or wireless connections.

The network 1020 may comprise one or more IP networks, public switched telephone networks (PSTNs), packet data networks, optical networks, wide area networks (WANs), local area networks (LANs), wireless local area networks (WLANs), public land mobile networks (PLMNs), wired networks, wireless networks, metropolitan area networks, and other networks to enable communication between devices. The network nodes 1000, 1000a may be arranged for performing the method demonstrated with reference to FIG. 4.

The network node 1000 comprises a processor 1002, storage 1003, interface 1001, and antenna 1001a. These components are depicted as single boxes located within a single larger box. In practice however, a network node may comprise multiple different physical components that make up a single illustrated component (e.g., interface 1001 may comprise terminals for coupling wires for a wired connection and a radio transceiver for a wireless connection). Similarly, network node 1000 may be composed of multiple physically separate components (e.g., a NodeB component and a radio network controller (RNC) component, a base transceiver station (BTS) component and a base station controller (BSC) component, etc.), which may each have their own respective processor, storage, and interface components. In certain scenarios in which network node 1000 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 1000 may be configured to support multiple radio access technologies (RATs). In such embodiments, some components may be duplicated (e.g., separate storage 1003 for the different RATs) and some components may be reused (e.g., the same antenna 1001*a* may be shared by the RATs).

The processor 1002 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 1000 components, such as storage 1003, network node 1000 functionality. For example, processor 1002 may execute instructions stored in storage 1003. Such functionality may include providing various wireless features discussed herein to a wireless communication device, such as the wireless communication device 1010, including any of the features or benefits disclosed herein.

Storage 1003 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1003 may store any suitable instructions, data or information, including software and encoded logic, utilized by the network node 1000. the storage 1003 may be used to store any calculations made by the processor 1002 and/or any data received via the interface 1001.

The network node 1000 also comprises the interface 1001 which may be used in the wired or wireless communication of signaling and/or data between network node 1000, network 1020, and/or wireless communication device 1010. For example, the interface 1001 may perform any formatting, coding, or translating that may be needed to allow network node 1000 to send and receive data from the network 1020 over a wired connection. The interface 1001 may also include a radio transmitter and/or receiver that may be coupled to or a part of the antenna 1001*a*. The radio may receive digital data that is to be sent out to other network nodes or wireless communication devices via a wireless connection. The radio may convert the digital data into a radio signal having the appropriate channel and bandwidth parameters. The radio signal may then be transmitted via antenna 1001*a* to the appropriate recipient (e.g., the wireless communication device 1010).

The antenna 1001*a* may be any type of antenna capable of transmitting and receiving data and/or signals wirelessly. In some embodiments, antenna 1001*a* may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. The antenna 1001*a* may comprise one or more elements for enabling different ranks of SIMO, MISO or MIMO operation, or beamforming operations.

The wireless communication device 1010 may be any type of communication device, wireless communication device, UE, D2D device or ProSe UE, but may in general be any device, sensor, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine to machine (M2M) communication, etc., which is able to wirelessly send and receive data and/or signals to and from a network node, such as network node 1000 and/or other wireless communication devices. The wireless communication device 1010 comprises a processor 1012, storage 1013, interface 1011, and antenna 1011*a*. Like the network node 1000, the components of the wireless communication device 1010 are depicted as single boxes located within a single larger box, however in practice a wireless communication device may comprises multiple different physical components that make up a single illustrated component (e.g., storage 1013 may comprise multiple discrete microchips, each microchip representing a portion of the total storage capacity).

The processor 1012 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless communication device 1010 components, such as storage 1013, wireless communication device 1010 functionality. Such functionality may include providing various wireless features discussed herein, including any of the features or benefits disclosed herein.

The storage 1013 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 1013 may store any suitable data, instructions, or information, including software and encoded logic, utilized by the wireless communication device 1010. The storage 1013 may be used to store any calculations made by the processor 1012 and/or any data received via the interface 1011.

The interface 1011 may be used in the wireless communication of signaling and/or data between the wireless communication device 1010 and the network nodes 1000, 1000*a*. For example, the interface 1011 may perform any formatting, coding, or translating that may be needed to allow the wireless communication device 1010 to send and receive data to/from the network nodes 1000, 1000*a* over a wireless connection. The interface 1011 may also include a radio transmitter and/or receiver that may be coupled to or a part of the antenna 1011*a*. The radio may receive digital data that is to be sent out to e.g. the network node 1001 via a wireless connection. The radio may convert the digital data into a radio signal having the appropriate channel and bandwidth parameters. The radio signal may then be transmitted via the antenna 1011*a* to e.g. the network node 1000.

The antenna 1011*a* may be any type of antenna capable of transmitting and receiving data and/or signals wirelessly. In some embodiments, antenna 1011*a* may comprise one or more omni-directional, sector or panel antennas operable to transmit/receive radio signals between 2 GHz and 66 GHz. For simplicity, antenna 1011*a* may be considered a part of interface 1011 to the extent that a wireless signal is being used. The antenna 1011a may comprise one or more elements for enabling different ranks of SIMO, MISO or MIMO operation, or beamforming operations.

In some embodiments, the components described above may be used to implement one or more functional modules used for enabling measurements as demonstrated above. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by the processors 1012 and/or 1002, possibly in cooperation with the storage 1013 and/or 1003. The processors 1012 and/or 1002 and the storage 1013 and/or 1003 may thus be arranged to allow the processors 1012 and/or 1002 to fetch instructions from the storage 1013 and/or 1003 and execute the fetched instructions to allow the respective functional module to perform any features or functions disclosed herein. The modules may further be configured to perform other functions or steps not explicitly described herein but which would be within the knowledge of a person skilled in the art.

Figure 9:
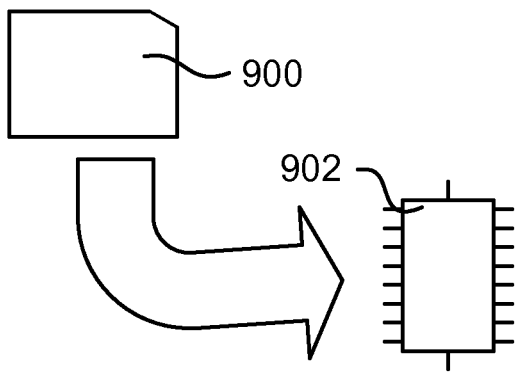
FIG. 9 schematically illustrates a computer-readable medium and a processing device.

The methods of the network node as demonstrated with reference to FIG. 4 are suitable for implementation with aid of processing means, such as computers and/or processors, especially for the case where the processing element 1002 demonstrated above comprises a processor of a network node arranged for performing or facilitating synchronisation. Therefore, there is provided computer programs, comprising instructions arranged to cause the processing means, processor, or computer to perform the steps of any of the methods according to any of the embodiments described above. The computer programs preferably comprise program code which is stored on a computer readable medium 900, as illustrated in FIG. 9, which can be loaded and executed by a processing means, processor, or computer 902 to cause it to perform the methods, respectively, according to embodiments of the present invention, preferably as any of the embodiments described above. The computer 902 and computer program product 900 can be arranged to execute the program code sequentially where actions of the any of the methods are performed stepwise, or operate according to a real-time scheme. The processing means, processor, or computer 902 is preferably what normally is referred to as an embedded system. Thus, the depicted computer readable medium 900 and computer 902 in FIG. 9 should be construed to be for illustrative purposes only to provide understanding of the principle, and not to be construed as any direct illustration of the elements.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method performed by a wireless node in a wireless communication network for receiving a reference signal, the method comprising:
   collecting a first set of samples of the received signal in a time domain, the collecting being based on a preliminary time synchronization assumption and preliminary frequency synchronization assumption, the preliminary time synchronization assumption being based on timing advance information and the preliminary frequency synchronization assumption being based on a coarse synchronization achieved through an acquired synchronization signal block;
   collecting a second set of samples in the time domain of the received signal with an offset corresponding to a fraction of a symbol time with relation to the first set of samples;
   zero padding the first and second set of samples;
   transforming the first set of samples and the second set of samples into a frequency domain after zero padding;
   forming a plurality of hypotheses including at least one of a set of hypotheses for time offset of the received signal and a set of hypotheses for frequency offset of the received signal;
   correlating the frequency domain samples of the received signal with at least a subset of the plurality of hypotheses; and
   selecting a hypothesis based on the correlation, the selected hypothesis corresponding to a synchronization of the received signal such that the synchronization is achieved, the selecting of the hypothesis being made among correlations made for the first set of samples and second set of samples such that the synchronization is achieved for a wider time search range than with a single one of the first set of samples or the second set of samples.

2. The method of claim 1, wherein the subset of hypotheses forms a search range.

3. The method of claim 2, wherein the search range is based on the at least one of the preliminary time and the frequency synchronization assumption.

4. The method of claim 2, wherein the search range is based on information received from a network node of the cellular communication system.

5. The method of claim 2, wherein the search range is based on information pre-defined for the cellular communication system.

6. The method of claim 1, wherein the fraction of the symbol time corresponds to no more than a half symbol time.

7. The method of claim 1, wherein the collecting of samples is made such that a channel state information reference signal, CSI-RS, of the received signal is included in the samples.

8. The method of claim 1, wherein the collecting of samples is made such that a sounding reference signal, SRS, of the received signal is included in the samples.

9. A wireless communication device comprising a transceiver and a processor configured to:
   collect a first set of samples of the received signal in a time domain, the collecting being based on a preliminary time synchronization assumption and preliminary frequency synchronization assumption, the preliminary time synchronization assumption being based on timing advance information and the preliminary frequency synchronization assumption being based on a coarse synchronization achieved through an acquired synchronization signal block;

collect a second set of samples in the time domain of the received signal with an offset corresponding to a fraction of a symbol time with relation to the first set of samples;

zero pad the first and second set of samples;

transform the first set of samples and the second set of samples into a frequency domain after zero padding;

form a plurality of hypotheses including at least one of a set of hypotheses for time offset of the received signal and a set of hypotheses for frequency offset of the received signal;

correlate the frequency domain samples of the received signal with at least a subset of the plurality of hypotheses; and select a hypothesis based on the correlation, the selected hypothesis corresponding to a synchronization of the received signal such that the synchronization is achieved, the selecting of the hypothesis being made among correlations made for the first set of samples and second set of samples such that the synchronization is achieved for a wider time search range than with a single one of the first set of samples or the second set of samples.

10. A network node of a cellular communication network, the network node comprising a transceiver and a processor configured to:

collect a first set of samples of the received signal in a time domain, the collecting being based on a preliminary time synchronization assumption and preliminary frequency synchronization assumption, the preliminary time synchronization assumption being based on timing advance information and the preliminary frequency synchronization assumption being based on a coarse synchronization achieved through an acquired synchronization signal block;

collect a second set of samples in the time domain of the received signal with an offset corresponding to a fraction of a symbol time with relation to the first set of samples;

zero pad the first and second set of samples;

transform the first set of samples and the second set of samples into a frequency domain after zero padding;

form a plurality of hypotheses including at least one of a set of hypotheses for time offset of the received signal and a set of hypotheses for frequency offset of the received signal;

correlate the frequency domain samples of the received signal with at least a subset of the plurality of hypotheses; and select a hypothesis based on the correlation, the selected hypothesis corresponding to a synchronization of the received signal such that the synchronization is achieved, the selecting of the hypothesis being made among correlations made for the first set of samples and second set of samples such that the synchronization is achieved for a wider time search range than with a single one of the first set of samples or the second set of samples.

11. A non-transitory computer storage medium storing an executable computer program comprising instructions which, when executed on a processor of one of a wireless communication device and a network node, causes the corresponding one of the wireless communication device and the network to collect a first set of samples of the received signal in a time domain, the collecting being based on a preliminary time synchronization assumption and preliminary frequency synchronization assumption, the preliminary time synchronization assumption being based on timing advance information and the preliminary frequency synchronization assumption being based on a coarse synchronization achieved through an acquired synchronization signal block;

collect a second set of samples in the time domain of the received signal with an offset corresponding to a fraction of a symbol time with relation to the first set of samples;

zero pad the first and second set of samples;

transform the first set of samples and the second set of samples into a frequency domain after zero padding;

form a plurality of hypotheses including at least one of a set of hypotheses for time offset of the received signal and a set of hypotheses for frequency offset of the received signal;

correlate the frequency domain samples of the received signal with at least a subset of the plurality of hypotheses; and select a hypothesis based on the correlation, the selected hypothesis corresponding to a synchronization of the received signal such that the synchronization is achieved, the selecting of the hypothesis being made among correlations made for the first set of samples and second set of samples such that the synchronization is achieved for a wider time search range than with a single one of the first set of samples or the second set of samples.

12. The method of claim 1, wherein the subset of hypotheses forms a search range.

* * * * *